United States Patent [19]

Kojima et al.

[11] Patent Number: 4,794,555
[45] Date of Patent: Dec. 27, 1988

[54] WAVEFORM SHAPING CIRCUIT

[75] Inventors: Yuichi Kojima, Tokyo; Yoshiyuki Chiba, Kanagawa, both of Japan

[73] Assignee: Sony Corporation, Tokyo, Japan

[21] Appl. No.: 828,171

[22] Filed: Feb. 11, 1986

[30] Foreign Application Priority Data

Feb. 13, 1985 [JP] Japan .................. 60-26029

[51] Int. Cl.$^4$ .................................. G06F 15/31
[52] U.S. Cl. .................. 364/724.01; 364/724.16
[58] Field of Search ................. 364/724; 375/12

[56] References Cited

U.S. PATENT DOCUMENTS

| 3,777,130 | 12/1973 | Croisier et al. | 364/724 |
| 4,323,864 | 4/1982 | Ogawa et al. | 364/724 X |
| 4,435,823 | 3/1984 | Davis et al. | 364/724 X |
| 4,484,299 | 11/1984 | Lambourn et al. | 364/724 |

*Primary Examiner*—David H. Malzahn
*Attorney, Agent, or Firm*—Hill, Van Santen, Steadman & Simpson

[57] ABSTRACT

A waveform shaping circuit for use with a digital signal transmission apparatus includes an N stage shift register having a digital data input terminal and first and second sets of output terminals, a pair of read only memories each having a plurality of address control terminals controlled by the output signal from the first and second sets of output terminals of the shift register and an output signal, an adder supplied with the output signals from the pair of read only memories so as to produce a digital output signal to be D/A (digital-to-analog)-converted.

3 Claims, 4 Drawing Sheets

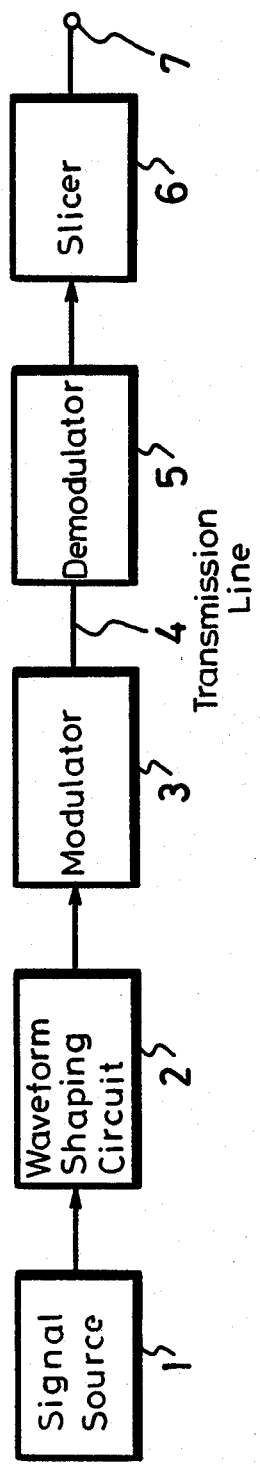
F I G. 1

WAVEFORM SHAPING CIRCUIT

BACKGROUND OF THE INVENTION

1. Field of the Invention

The present invention relates generally to a waveform shaping circuit and more particularly to a waveform shaping circuit for use with a digital signal transmission apparatus of a digital communication system.

2. Description of the Prior Art

A prior art digital signal transmission apparatus of a digital communication system is generally constructed as shown in FIG. 1. Referring to FIG. 1, the digital signal from a signal source 1 is supplied through a waveform shaping circuit 2 to a modulator 3. The modulated signal from the modulator 3 is supplied through a transmission line 4 to a demodulator 5 which constructs a receiving side. Then, the demodulated signal from the demodulator 5 is supplied through a slicer 6 to an output terminal 7. In this case, in order to realize the high efficiency digital signal transmission, the inter symbol interference and interference between adjacent channels must be minimized. Since according to the Nyquist transmission system, the inter symbol interference can be theoretically minimized to zero upon discrimination time and also the power outside a desired frequency band can be suppressed, in order to realize such Nyquist transmission system, the waveform shaping circuit 2 in FIG. 1 is constructed by such a binary transversal filter as shown in FIG. 2. Since this binary transversal filter can be designed in a direct time region, it is expected that the circuit can be made high in precision.

Referring to FIG. 2, reference numeral 8 designates a data input terminal to which a digital data signal to be transmitted is applied. Reference numerals 9a, 9b, ... 9h respectively designate flip-flop circuits which constitute a shift register 9 which is supplied with the digital data signal from the data input terminal 8. Further, reference numeral 10 designates a clock input terminal to which a clock signal having the frequency twice as high as a data transfer rate is applied. The clock signal applied to this clock signal input terminal 10 is supplied to the flip-flop circuits 9a, 9b, ... 9h constituting the shift register 9 as a shift signal. Reference numerals 11a, 11b, ... 11h respectively designate resistors which construct a weighting circuit. Reference numeral 12 designates an output terminal. When the binary transversal filter as shown in FIG. 2 is used in the waveform shaping circuit 2 of FIG. 1, a desired impulse response can be approximated by a staircase waveform and such staircase waveform is passed through a low-pass filter so as to be smoothed, thus the Nyquist transmission system being formed.

However, according to the binary transversal filter constructing such waveform shaping circuit 2, the shift register 9 supplied with the input data signal is operated at the clock signal having the frequency twice as high as the data transfer rate and the output signals from the respective flip-flop circuits 9a, 9b, ... 9h which constitute the shift register 9 are weighted by the resistance values of the weighting resistors 11a, 11b, ... 11h. Since this binary transversal filter uses the resistors 11a, 11b, . . . 11h as the weighting circuits, when it is intended to increase the accuracy in waveform-shaping, a fine adjusting circuit must be provided for each tap or stage of the shift register. Further, this binary transversal filter has a defect that it will be directly affected by the logical amplitude fluctuation of the output from the shift register 9.

To solve the problem, such a waveform shaping circuit is proposed that instead of the resistors 11a, 11b, .. . 11h constituting the weighting circuit, there are provided a ROM (read only memory) 13 and a D/A (digital-to-analog) converting circuit 14 as shown in FIG. 3. Referring to FIG. 3, 8 output terminals of the shift register 9 formed of 8 flip-flop circuits 9a, 9b, ... 9h are respectively connected to address control terminals of the ROM 13 having the address control terminals, the number thereof being corresponding to the number of the output terminals. In this case, the ROM 13 prepares a predetermined table by which the weighting operation of $2^8 = 256$ words (one word is formed of 8 bits) is carried out. Then, the ROM 13 generates a data corresponding to the input pattern to the ROM 13 as the 8-bit digital value. The 8-bit digital output signal from the ROM 13 is supplied to the D/A converting circuit 14 and also a clock signal from an input terminal 10 is supplied to the D/A converting circuit 14. The output side of this D/A converting circuit 14 is connected to an output terminal 12. Other circuit elements are formed the same as those of FIG. 2. In the example shown in FIG. 3, since the ROM 13 is used, the weighting of each tap of the shift register 9 is prepared as the table, the value corresponding to the input pattern of the data signal is generated as the digital value and this digital value is converted to the desired analog waveform by the D/A converting circuit 14, there is an advantage that it is possible to remove such the defect that the resistor is used as the weighting circuit.

However, in the example of the waveform shaping circuit shown in FIG. 3, when the number of the stages of the shift register 9 is increased, since the capacity of the ROM 13 has a limit, there is a disadvantage that the aforesaid waveform shaping circuit can not be realized.

Therefore, such a waveform shaping circuit is proposed as shown in FIG. 4. As FIG. 4 shows, the data signal applied to the data input terminal 8 is supplied to a plurality of shift registers, for example, two shift registers $9_1$ and $9_2$ each formed of a predetermined stage, for example, 4 stages of flip-flop circuits 9a, 9b, 9c and 9d and having predetermined stages. 4 output terminals of each of these two shift registers $9_1$ and $9_2$ are respectively connected to address control terminals of two weighting ROMs $13_1$ and $13_2$, the number of address control terminals of each of which is made corresponding to the number of the output terminals. A clock signal P1 having the frequency twice as high as the data transfer rate, which is applied to the clock input terminal 10, is supplied to a ½ frequency divider 15. A clock signal P2 having the frequency equal to the data transfer rate and generated at the output of the ½ frequency divider 15 is spplied to each of the flip-flop circuits 9a, 9b, 9c and 9d of the shift register $9_1$ as a shift signal. At the same time, this clock signal P2 is supplied through a $\pi$ phase shifter 16, which shifts the phase of the clock signal P2 by $\pi$, to the respective flip-flop circuits 9a, 9b, 9c and 9d forming the shift register $9_2$ as a shift signal. 8-bit output signals from the ROMs $13_1$ and $13_2$ are respectively supplied to D/A converting circuits $14_1$ and $14_2$ and the clock signal P1 from the clock input terminal 10 is supplied to these A/D converting circuits $14_1$ and $14_2$. Then, analog output signals from the D/A converting circuits $14_1$ and $14_2$ are added together and then fed to an output terminal 12. In this case, since the shift register $9_1$ is driven by using the clock signal P2 having the frequency equal to the data transfer rate and the shift register $9_2$ is driven by the clock signal which results from phase-shifting the clock signal P2 by $\pi$ by the $\pi$ phase shifter 16, the shift registers $9_1$ and $9_2$ are equivalently driven by the clock signal having the frequency twice as high as the data transfer rate. In this case, it is sufficient that the ROMs $13_1$ and $13_2$ may prepare a predetermined table by which the weighting of, for example, $2^4=16$ words (one word is formed of 8 bits) is carried out. Accordingly, it is possible to use the ROMs $13_1$ and $13_2$ each having a small capacity.

However, since the example shown in FIG. 4 employs the phase shifter circuit 16, there is a fear that the waveform shaping will be affected by the phase error of the clock signal. Also, since the number of the D/A converting circuits $14_1$ and $14_2$ must be made corresponding to the number of the ROMs $13_1$ and $13_2$, there is a disadvantage that the circuit arrangement thereof becomes large in size by so much.

OBJECTS AND SUMMARY OF THE INVENTION

Accordingly, it is an object of this invention to provide a waveform shaping circuit which can waveform-shape a signal with high precision and which can be made small in size.

It is another object of this invention to provide a waveform shaping circuit which uses a single D/A (digital-to analog) converter.

In accordance with one example of the invention, there is provided a waveform shaping circuit for use with a digital signal transmission apparatus comprising:

(a) an N stage shift register having a digital data input terminal and first and second sets of output terminals, said digital data input terminal being supplied with a digital data to be waveform-shaped;

(b) a first read only memory having a plurality of address control terminals and an output terminal;

(c) a second read only memory having a plurality of address control terminals and an output terminal;

(d) circuit means for connecting respective address control terminals of said first read only memory to the first set of output terminals of said shift register and for connecting respective address control terminals of said second read only memory to the second set of output terminals of said shift register;

(e) an adder having input terminals connected to the output terminals of said first and second read only memories and an output terminal for producing a digital output signal which is the added digital signal of the outputs of said first and second read only memories; and (f) a D/A (digital-to-analog) converter supplied with the digital output signal from said adder so as to produce a waveform-shaped output signal corresponding to said digital data.

The other objects, features and advantages of the present invention will be apparent from the following description taken in conjunction with the attached drawings.

BRIEF DESCRIPTION OF THE DRAWINGS

FIG. 1 is a circuit block diagram showing one example of a digital data transmission apparatus which uses a waveform shaping circuit of the present invention;

DESCRIPTION OF THE PREFERRED EMBODIMENTS

Figure 2:
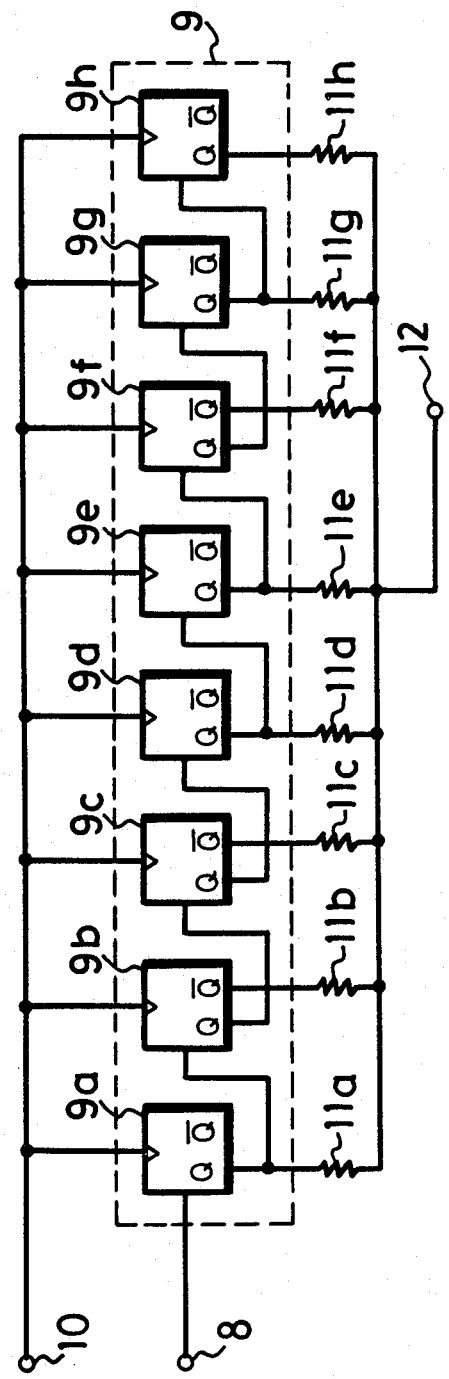
FIGS. 2 to 4 are circuit block diagrams each showing one example of prior art waveform shaping circuits, respectively.
Figure 3:
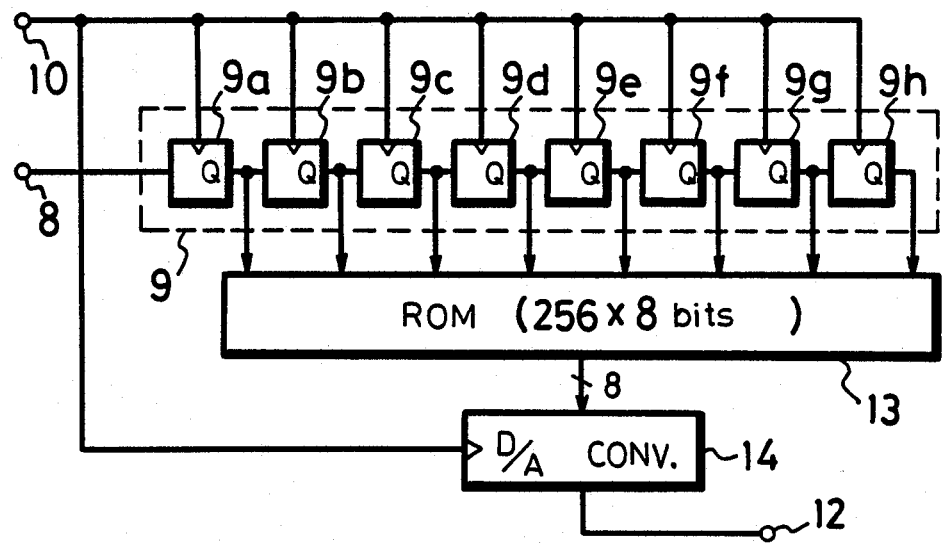
Figure 5:
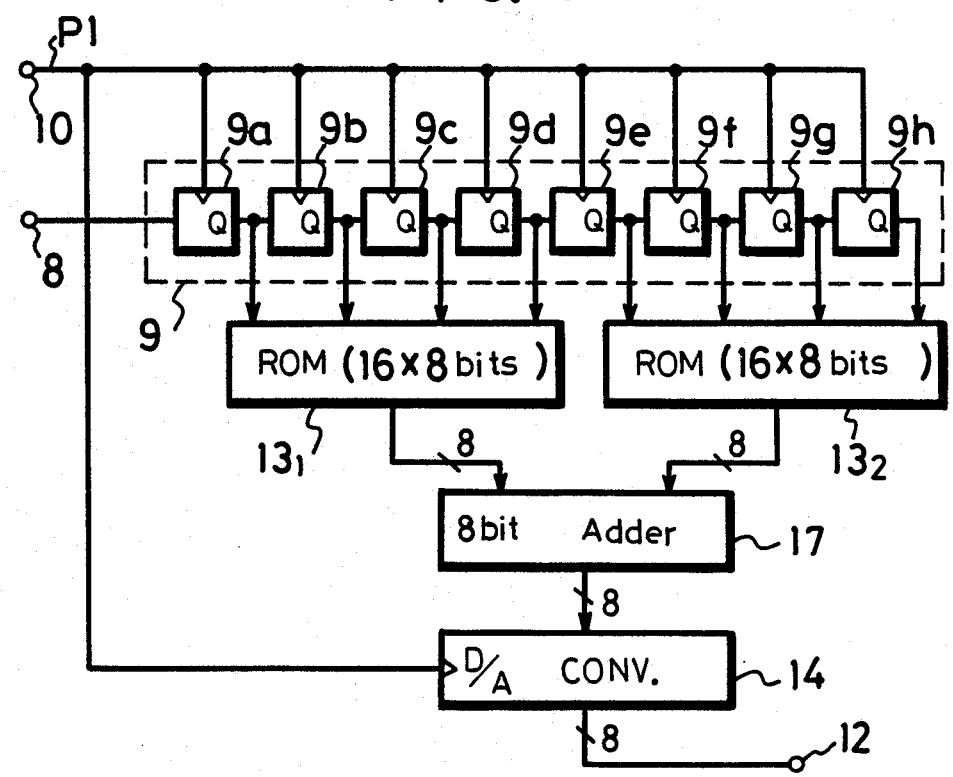
FIG. 5 is a circuit block diagram showing an embodiment of a waveform shaping circuit according to the present invention.
Figure 4:
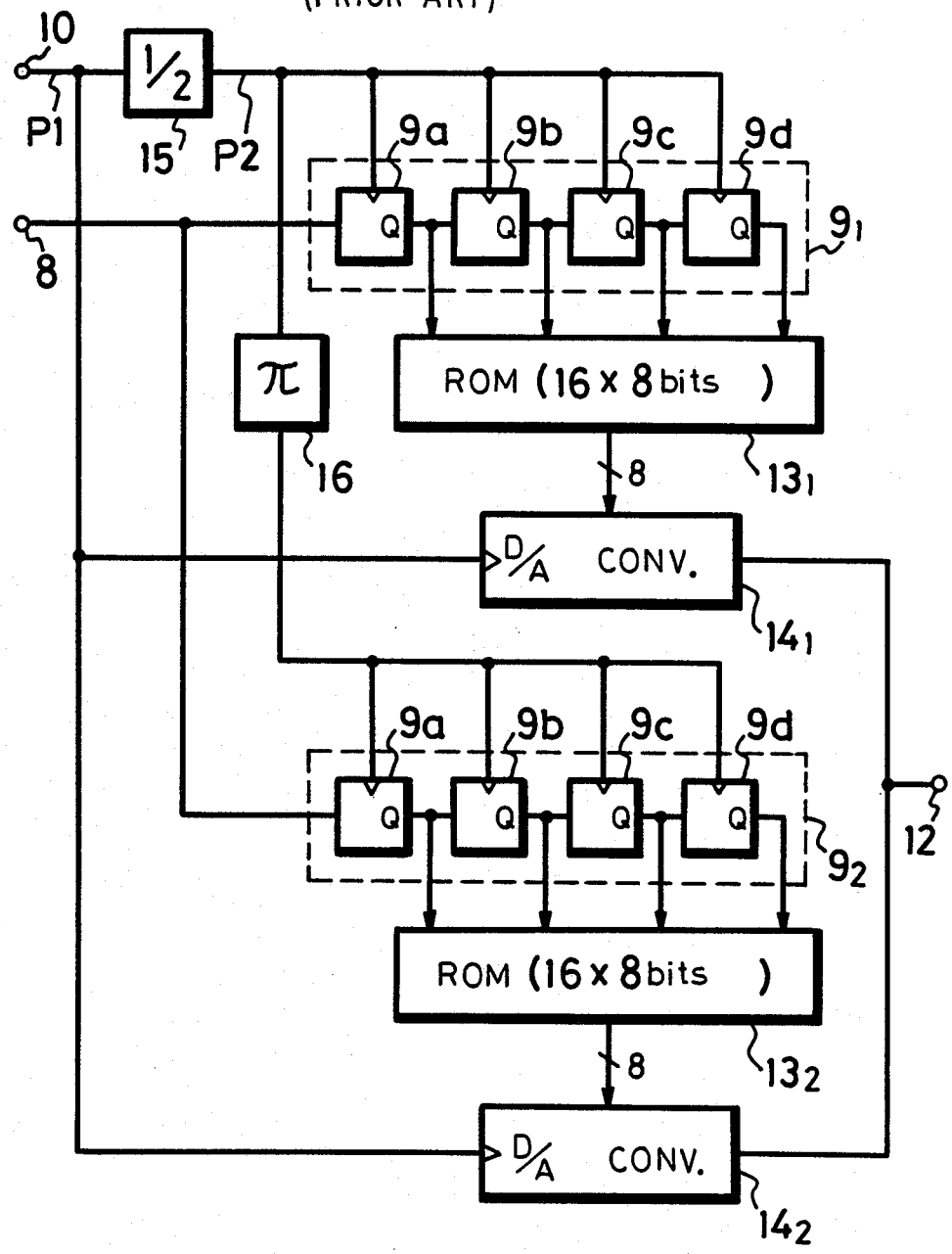

Now, an embodiment of a waveform shaping circuit according to this invention will hereinafter be described with reference to FIG. 5. In FIG. 5, like parts corresponding to those of FIGS. 2 to 4 are marked with the same references and they will not be described in detail.

Referring to FIG. 5, a digital data signal to be transmitted and applied to the data input terminal 8 is supplied to the shift register 9 formed of, for example, 8 flip-flop circuits $9a, 9b, \ldots 9h$. The 8 output terminals of this shift register 9 is divided by two, the output terminals of 4 flip-flop circuits $9a, 9b, 9c$ and $9d$ are connected to address control terminals of the first ROM $13_1$ having 4 addresses; while, the output terminals of the succeeding 4 flip-flop circuits $9e, 9f, 9g$ and $9h$ are respectively connected to the address control terminals of the second ROM $13_2$ having 4 addresses. Then, the clock signal P1 having the frequency twice as high as the data transfer rate and applied to the clock input terminal 10 is supplied to the respective flip-flop circuits $9a, 9b, \ldots 9h$ which form the shift register 9.

In this case, the first and second ROMs $13_1$ and $13_2$ each prepare a predetermined table by which the weighting operation of $2^4=16$ words (one word is formed of 8 bits) is carried out and data corresponding to the input patterns to the first and second ROMs $13_1$ and $13_2$ are generated as the 8-bit digital values.

The 8-bit digital output signals from the first and second ROMs $13_1$ and $13_2$ are both supplied to an 8-bit digital adder 17 in which they are added together. The output signal from the digital adder 17 is supplied to the D/A converting circuit 14, and the output side of the D/A converting circuit 14 is connected to the output terminal 12. Also, this D/A converting circuit 14 is operated by the clock signal P1 having the frequency twice as high as the data transfer rate applied to the clock input terminal 10.

According to this embodiment, since a plurality of ROMs $13_1$ and $13_2$ are provided, the output signals from the plurality of ROMs $13_1$ and $13_2$ are added in digital manner and then converted from a digital signal to an analog signal, even if the stage number (tap number) of the shift register 9 is increased, a waveform shaping circuit having multi-stages can be realized by preparing the ROMs of a proper number and the digital adder 17. In this case, since the weighting circuit is formed of the plurality of ROMs $13_1$ and $13_2$ and the D/A converting circuit 14, it is possible to realize the waveform shaping circuit which can waveform-shape the signal with high precision. Furthermore, since the output signals from the plurality of ROMs $13_1$ and $13_2$ are digitally added and then converted from the digital signal to the analog signal, it is sufficient to provide the single D/A converting circuit 14 so that the apparatus can be made small in size so much.

Figure 6:
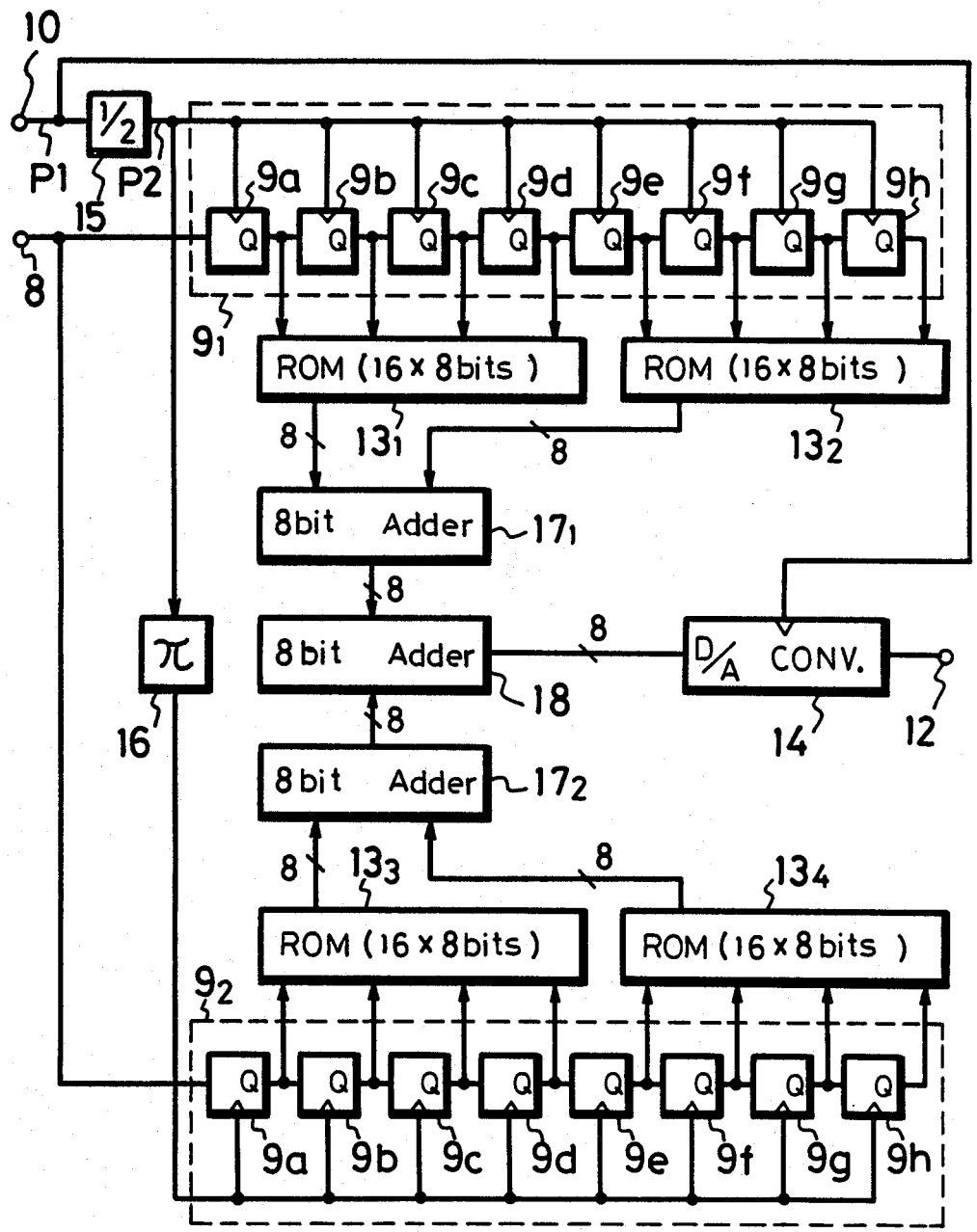
FIG. 6 is a circuit block diagram showing another embodiment of the waveform shaping circuit according to the present invention.

FIG. 6 illustrates another embodiment of the waveform shaping circuit according to the present invention. This embodiment is a modified example in which the number of the stages of the shift register is increased more than ever. In FIG. 6, like parts corresponding to those of FIGS. 4 and 5 are marked with the same reference numerals and will not be described in detail.

As FIG. 6 shows, the data signal applied to the data input terminal 8 is supplied to two shift registers $9_1$ and $9_2$ each formed of, for example, 8 flip-flop circuits $9a$, $9b$, ... $9h$. The 8 output terminals of one shift register $9_1$ are divided by two, and 4 output terminals of the 4 flip-flop circuits $9a$, $9b$, $9c$ and $9d$ from the first one are respectively connected to the address control terminals of the first ROM $13_1$ having 4 addresses; while, 4 output terminals of the succeeding 4 flip-flop circuits $9e$, $9f$, $9g$ and $9h$ are respectively connected to the address control terminals of the second ROM $13_2$ having 4 addresses. 8 terminals of another shift register $9_2$ are divided by two, and 4 output terminals of the flip-flop circuits $9a$, $9b$, $9c$ and $9d$ from the first one are respectively connected to address control terminals of a third ROM $13_3$ having 4 addresses; while, 4 output terminals of the succeeding 4 flip-flop circuits $9e$, $9f$, $9g$ and $9h$ are respectively connected to address control terminals of a fourth ROM 134 having 4 addresses. The clock signal P1 having the frequency twice as high as the data transfer rate applied to the clock input terminal 10 is supplied to a ½ frequency divider 15. The clock signal P2 having the frequency equal to the data transfer rate and obtained at the output of the ½ frequency divider 15 is supplied to the respective flip-flop circuits $9a$, $9b$, ... $9h$ constituting the shift register $9_1$ as the shift signal. This clock signal P2 is also supplied through the $\pi$ phase shifter 16, which phase-shifts the clock signal P2 by $\pi$, to the respective flip-flop circuits $9a$, $9b$, ... $9h$ of the shift register $9_2$ as the shift signal.

In this case, each of the first to fourth ROMs $13_1$ to $13_4$, prepares a predetermined table by which the weighting operation of $2^4 = 16$ words (one word is formed of 8 bits) is carried out. Then, the data corresponding to the input patterns to the first to fourth ROMs $13_1$ to $13_4$ are generated as 8-bit digital values, respectively.

The 8-bit digital output signals from the first and second ROMs $13_1$ and $13_2$ are both supplied to an 8-bit digital adder $17_1$ in which they are added; while, the 8-bit digital output signals from the third and fourth ROMs $13_3$ and $13_4$ are both supplied to an 8-bit digital adder $17_2$ and thereby added together. The 8-bit digital output signals from the digital adders $17_1$ and $17_2$ are supplied to an 8-bit digital adder 18 in which they are added together. The output signal from this digital adder 18 is supplied through the D/A converting circuit 14 to the output terminal 12, while this D/A converting circuit 14 is operated by the clock signal P1 having the frequency twice as high as the data transfer rate generated at the clock input terminal 10. In this embodiment shown in FIG. 6, since the shift register $9_1$ is driven by using the clock signal P2 having the frequency equal to the data transfer rate and the shift register $9_2$ is driven by the clock signal, which results from phase-shifting the clock signal P2 by $\pi$ by the $\pi$ phase shifter 16, the shift register are equivalently driven at the frequency twice as high as the data transfer rate, the capacity of the ROMs $13_1$, $13_2$, $13_3$ and $13_4$ can be made small similarly to hhe first embodiment of FIG. 5. Further, according to the second embodiment of the present invention shown in FIG. 6, since the respective output signals from the ROMs $13_1$ and $13_2$ are both added by the first digital adder $17_1$, the respective outputs from the ROMs $13_3$ and $13_4$ are both added together by the second digital adder $17_2$, the output signals from these digital adders $17_1$ and $17_2$ are added together by the digital adder 18 and then converted from the digital signal to the analog signal by the D/A converter 14, it is sufficient that only one D/A converter 14 is provided.

Furthermore, it can easily be understood that the second embodiment of FIG. 6 can achieve the same action and effect as those of the first embodiment shown in FIG. 5.

According to the present invention as set forth above, since the ROMs $13_1$ and $13_2$ are divided into plural ones, the output signals from the plurality of ROMs $13_1$ and $13_2$ are digitally added and then converted from the digital signal to the analog signal by the single D/A converter, even if the number of the stages of the shift register 9 is increased, it is possible to realize the waveform shaping circuit having the multi-stages by using a proper number of the ROMs and the digital adders.

In addition, according to the present invention, since the weighting circuit is formed of the plurality of ROMs $13_1$ and $13_2$ and the D/A converting circuit 14, it is possible to obtain the waveform shaping circuit with high precision. Further, since the output signals from the plurality of ROMs $13_1$ and $13_2$ are digitally added together and then converted from the digital signal to the analog signal, it is sufficient that only one D/A converter 14 is provided. Hence, the waveform shaping circuit of the present invention can be made small in size.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. A waveform shaping circuit for use with a digital signal transmission apparatus comprising:
   (a) a first N stage shift register having a digital data input terminal and first and second sets of output terminals, said digital data input terminal being supplied with digital data to be waveform-shaped;
   (b) a first read only memory having a plurality of address control terminals and an output terminal;
   (c) a second read only memory having a plurality of address control terminals and an output terminal;
   (d) circuit means for connecting respective address control terminals of said first read only memory to the first set of output terminals of said shift register and for connecting respective address control terminals of said second read only memory to the second set of output terminals of said shift register;
   (e) first adder means having input terminals connected to the output terminals of said first and second read only memories and an output terminal for producing a digital output signal which is the added digital signal of the outputs of said first and second read only memories;
   (f) a second N stage shift register having a digital data input terminal and first and second sets of output terminals, said digital data input terminal being supplied with said digital data;
   (g) a third read only memory having a plurality of address control terminals connected to said first set of output terminals of said second N stage shift register and an output terminal;

(h) a fourth read only memory having a plurality of address control terminals connected to a second set of output terminals of said second N stage shift register and an output terminal;
(i) second adder means having input terminals connected to the output terminals of said third and fourth read only memories and an output terminal for producing a digital output signal which is the added digital signal of the outputs of said third and fourth read only memories;
(j) third adder means having input terminals connected to the output terminals of said first and second adder means and an output terminal for producing a digital output signal; and
(k) a D/A (digital-to-analog) converter supplied with the digital output signal from said third adder means so as to produce a waveform-shaped output signal corresponding to said digital data.

2. A waveform shaping circuit according to claim 1, in which the number of said address control terminals of said first through fourth read only memories are equal to one another.

3. A waveform shaping circuit according to claim 1, including means for supplying said first and second shift register with clock pulse signals having opposite phases.

* * * * *